Feb. 28, 1939.  E. G. HALLQUIST  2,148,942
RAILWAY TRUCK
Filed Sept. 9, 1935  2 Sheets-Sheet 1

Inventor
Einar G. Hallquist.
By Rodney Badell
Attorney

Feb. 28, 1939.  E. G. HALLQUIST  2,148,942
RAILWAY TRUCK
Filed Sept. 9, 1935  2 Sheets-Sheet 2
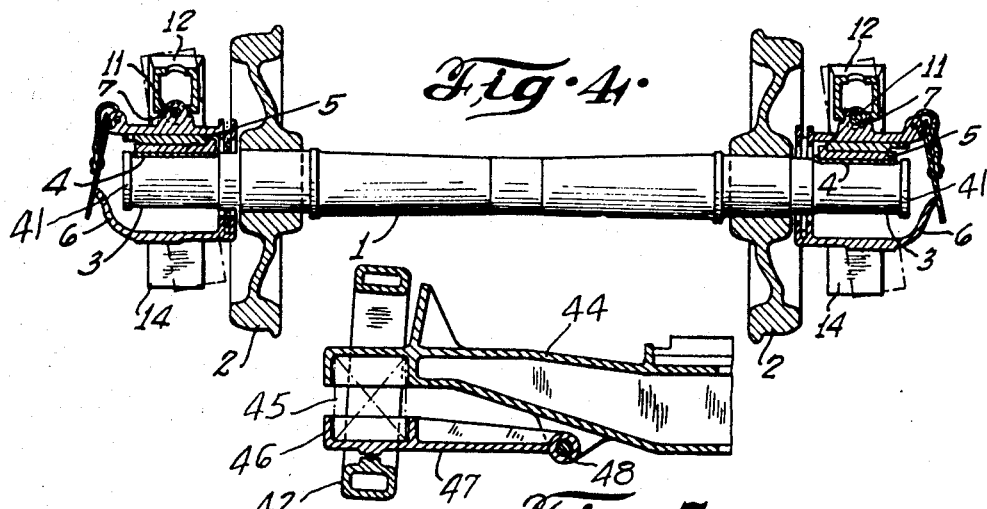
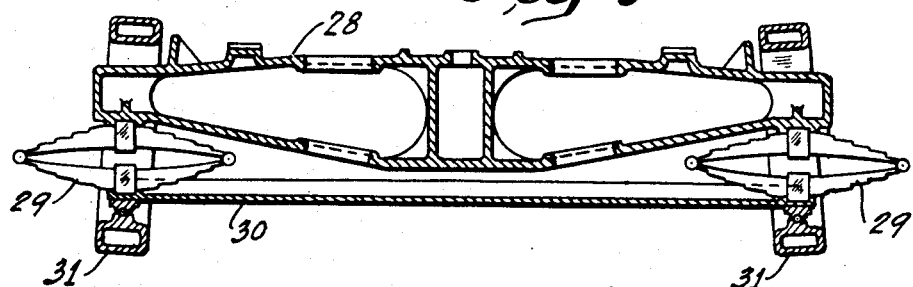
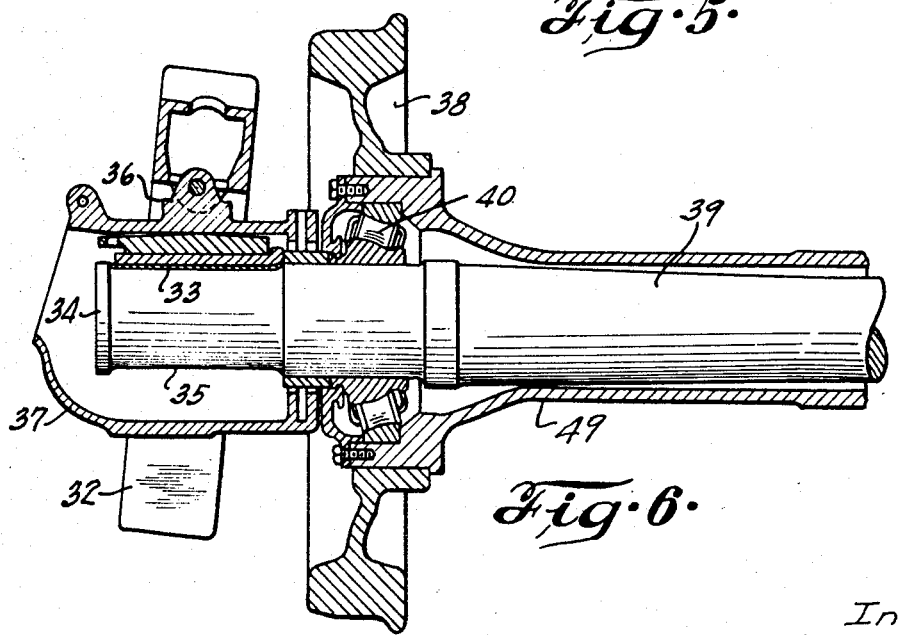
Inventor
Einar G. Hallquist.
By Rodney Bedell
Attorney Patented Feb. 28, 1939

2,148,942

UNITED STATES PATENT OFFICE 2,148,942

RAILWAY TRUCK

Einar G. Hallquist, Wallingford, Pa., assignor to General Steel Castings Corporation, Granite City, Ill., a corporation of Delaware Application September 9, 1935, Serial No. 39,673

15 Claims. (Cl. 105—190)

This invention relates to railway rolling stock and consists in novel truck structure.

Trucks for passenger cars and tenders are now provided practically universally with swing motion bolsters which reduce lateral shocks and impart easy riding qualities to the trucks. Freight trucks, which until recently have been operated at relatively slow speeds, generally have not had lateral motion bolsters due to the desirability of reducing, as far as possible, the cost and weight of such trucks.

With the substantially increased speeds of modern freight service, it is desirable to provide means for reducing lateral shocks produced when the trucks pass over switch points, frogs, and curves and other iregularities of the track. This should be accomplished, if possible, without substantially increasing the cost and weight of the trucks.

An object of the present invention is to provide a lateral motion truck which is substantially less expensive and complicated and also lighter than lateral motion trucks intended for passenger car and tender service.

Another object is to provide a swing motion truck suitable for high speed freight service.

These objects and others are attained substantially by the structures illustrated in the accompanying drawings in which—

Figures 3 and 4 are vertical transverse sections on the corresponding section lines of Figure 2.

Figure 5 is a vertical transverse section through the center of a truck and illustrating a modification.

Figure 6 is an enlarged vertical transverse section corresponding to Figure 4 and showing a modified detail.

Figure 7 is a half vertical transverse section similar to Figure 3 and showing another modification.

Figure 1:
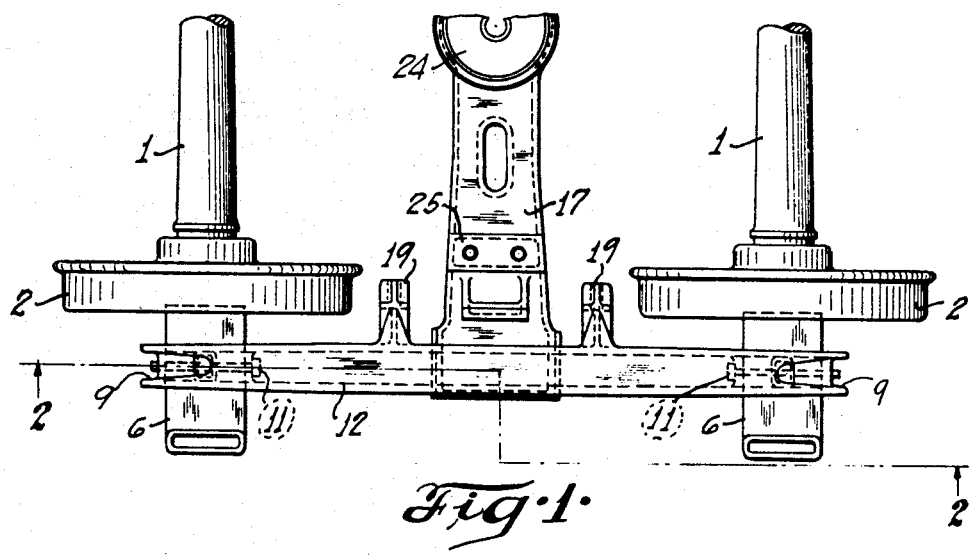
Figure 1 is a half top view of a truck embodying the invention.
Figure 2:
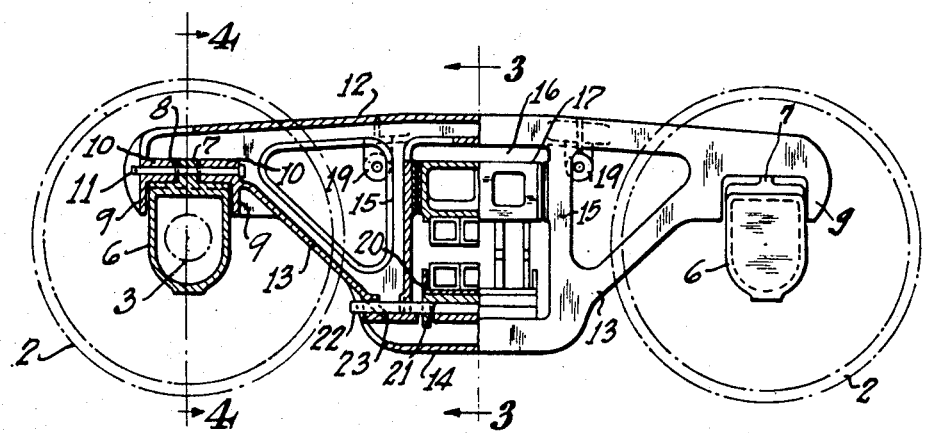
Figure 2 is a vertical longitudinal section and side view of the structure in Figure 1 and is taken on the line 2—2 thereof.

The truck in Figures 1 to 4 includes a pair of axles 1 having wheels 2 rigid therewith and journal portions 3 at their extremities. Mounted on each journal 3 is a bearing brass 4 and wedge 5, the journal, brass, and wedge being received within a journal box 6. Projecting upwardly from the top of each journal box is a lug or boss 7 which extends into a recess 8 in the undersurface of the truck side frame between the depending ribbed jaws 9 extending a relatively short distance downwardly along each side of the journal box. Lug 7 and portions 10 of the side frame at each side of the recess 8 are longitudinally apertured and pivotally connected by means of a bolt or pin 11.

The side frame illustrated is of the integral truss type including a top bar 12, inclined side bars 13, a bottom bar 14, and vertical posts 15. The top and bottom bars and posts 15 form an opening 16 therebetween receiving the end of bolster 17 and the bolster springs 18. Brake hanger brackets 19 are provided at the intersections of top bar 12 and posts 13. Springs 18 are carried directly upon a spring plank 20 which at each end has a bearing 21 pivotally carried upon a rod or bar 22. Rod 22 is seated on the side frame bottom bar 14 and extends through recesses in the frame portions 23 at the intersections of bars 13 and posts 15. The bolster 17 is provided with the usual center bearing 24, side bearings 25 for engaging the body bolster 26, and lateral motion stops 27 opposing the inner walls of the side frames.

Figure 3:
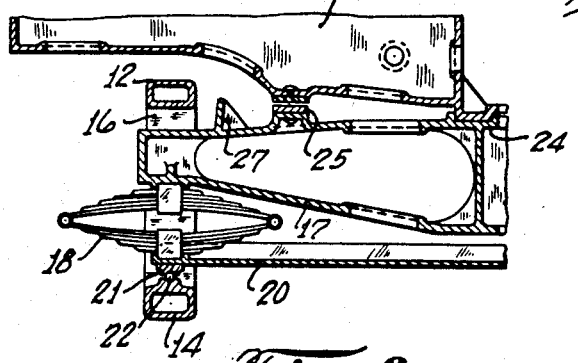

The truck side frames normally hang vertically, as shown in Figures 3 and 4, and, due to their pivotal mounting upon the journal boxes, may swing in either direction to permit lateral movement of the bolster, one swung position being shown in broken lines in Figure 4. The side frames function as bolster hangers and dampen the lateral play of the bolster in the manner of ordinary separately formed bolster hangers.

Figure 5 shows a bolster 28 carried through the bolster springs 29 and spring plank 30 on the lower portions of the truck side frames 31 which are pivoted, as in the previous form, on the journal boxes (not shown). The side frames 31 are normally held by the spring plank 30 in downwardly and outwardly inclined positions so as to increase the initial resistance to lateral motion of the bolster.

In the form of the invention shown in Figures 1 to 4, the wheels 2 are mounted directly on the axles 1, as shown in Figure 4, and the axles turn with the wheels. As the side frames hang vertically, the wear between the journal bearing 4 and the collar 41 at the end of the axle, due to the lateral component of the load when the bolster swings laterally relative to the side frame, is reduced to a minimum. This force increases after side frame is swung to one side during movement of the bolster but, by virtue of the swinging side frame, the lateral forces are gradually absorbed instead of the truck being subjected to severe shocks as in the case of the rigid side frame truck.

Figures 5 and 6 show the wheels 38 mounted on a housing 49 which in turn is mounted on the axle 39 through roller bearing 40. The side frames 32 are inclined in their normal positions, applying lateral pressure on the journal collars 34 substantially at all times. Wear between the bearing 33 and collar 34 is avoided since there is little or no rotation of the axle relative to the bearing. This construction is particularly adapted for high speed service where it would be desirable to supplement the benefit obtained by super-elevation of the truck on curves to overcome the centrifugal force acting on the car.

Figure 7 shows the invention applied to a spring plankless truck. The swinging side frame 42 supports the end of bolster 44 through coiled springs 45 seated at the bottom on the spring seating and stabilizing member 46. Member 46 is pivotally supported by the side frame and has a rigid inwardly extending arm 47 pivoted as at 48 to a portion of the bolster spaced substantially inwardly from the side frame. Member 46 prevents the application of lateral forces to the bolster springs. This form of bolster support is more fully described and claimed in a copending application Serial No. 31,143, filed July 13, 1935, in the name of the present applicant.

The brake hangers carried on the swinging side frames are subject to vertical movement, but this is no greater than is the case in ordinary trucks in which the hangers are pivoted to a part of the spring supported frame.

In each of the forms, lateral shocks on the truck are effectively reduced in transmission to the vehicle body due to the lateral motion of the bolster. The cost and weight of the truck are substantially less than is the case where separate bolster hangers are provided as in passenger and tender trucks. The swinging support of the bolster is more satisfactory than where the bolster is supported on rollers, which permit only limited lateral movement and do not dampen the side motion as well as hangers or the swinging side frames herein shown.

The particular type of side frame shown is merely illustrative and may be modified as desired, as may various other details of the truck. Where roller bearing wheels are used, as in Figure 6, it may be possible to mount the side frames directly upon suitable pivots at the ends of the axles without interposed journal boxes. The invention may also be applied to trucks having two, or six, or more wheels as well as the four-wheel trucks shown. These and other modifications may be made in the structures illustrated and the exclusive use of all such modifications coming within the scope of the claims is contemplated.

I claim:

1. In a railway truck, axles, anti-friction bearings mounted on said axles, wheels mounted on said anti-friction bearings to rotate on said axles, said bearings being adapted to carry the vertical loads of the truck and to resist transverse forces applied to the truck, journals on the ends of said axles, collars on said journals, friction bearings on said journals and held by said collars against movement outwardly of said axles, and side frames pivotally mounted on said friction bearings and normally inclined downwardly and outwardly from their pivotal mountings.

2. Structure as specified in claim 1 including a spring plank extending between said side frames.

3. In a railway truck, wheels and axles, journal boxes carried by said axles, side frames pivotally mounted on said journal boxes to swing transversely of the truck, individual spring seats carried on said side frames, springs supported by said seats, a bolster extending across the truck and mounted on said springs, and a tie between each of said spring seats and an adjacent portion of said bolster.

4. In a railway truck, wheels and axles, journal boxes carried by said axles, side frames pivotally mounted on said journal boxes to swing transversely of the truck, individual spring seats carried on said side frames, springs supported by said seats, a bolster extending across the truck and mounted on said springs, and a tie element extending inwardly from each of said spring seats and pivoted to said bolster.

5. In a railway truck, wheels and axles, journal boxes carried by said axles, side frames pivotally mounted on said journal boxes to swing transversely of the truck, individual spring seats carried on said side frames, springs supported by said seats, a bolster extending across the truck and mounted on said springs, each of said spring seats having a rigid extension projecting inwardly of the truck, and a horizontal pivot between said bolster and the inner end of each of said extensions.

6. In a railway truck, wheels and axles, journal boxes carried by said axles, side frames pivotally mounted on said journal boxes to swing transversely of the truck, individual spring seats carried on said side frames, springs supported by said seats, a bolster extending across the truck and mounted on said springs with the bottom of its central portion located below the level of said spring seats, the lower part of said bolster sloping upwardly and outwardly from said central portion, there being elements connecting said seats and the inclined portions of said bolster so as to prevent relative lateral movement between said bolster and seats.

7. In a railway truck, wheels and axles, journal boxes carried by said axles, side frames pivotally mounted on said journal boxes to swing transversely of the truck, individual spring seats carried on said side frames, springs supported by said seats, a bolster extending across the truck and mounted on said springs, the lower part of said bolster sloping upwardly and outwardly, there being elements connecting said seats and the inclined portions of said bolster so as to prevent relative lateral movement between said bolster and seats.

8. In a railway truck, a side frame having a bolster opening, the lower wall of which includes a longitudinally extending groove, a cylindrical element rotatably mounted in said groove, a spring seat pivotally mounted on said cylindrical element, a spring carried exclusively on said element, and a bolster extending over said spring with its ends supported thereon.

9. In a railway truck, spaced side frames each having a bolster opening, the lower wall of the opening in each frame having a longitudinally extending groove, cylindrical elements rotatably mounted in said grooves, a rigid spring plank extending from one of said frames to the other and having downwardly facing grooved portions receiving said elements, springs seated on said spring plank, and a bolster extending from side to side of the truck and extending over and resting on said springs.

10. In a railway truck, wheels and axles, journal boxes carried on said axles, side frames carried on said journal boxes, springs individually supported exclusively on said side frames, and a bolster extending over and carried on said springs, there being pivotal connections between said frames and said boxes and between said springs and said frames whereby said frames may tilt about a fixed axis on said boxes and said springs may tilt about a fixed axis on said frames, the structure including spacer means extending between said frames to hold them in predetermined relation to each other.

11. In a railway truck, wheels and axles, journal boxes carried on said axles, side frames carried on said journal boxes, springs mounted on said side frames, a bolster carried on said springs, there being pivotal connections between said frames and said boxes and between said springs and said frames whereby said frames may tilt about a fixed axis on said boxes and said springs may tilt about a fixed axis on said frames, and means connecting the lower portion of each of said springs and the adjacent part of the bolster to prevent tilting of said springs relative to said bolster.

12. In a railway truck, wheels and axles, journal boxes carried on said axles, side frames carried on said journal boxes, a spring plank extending between the lower portions of said frames, bolster supporting springs carried on said spring plank, there being pivotal connections between said frames and said boxes and between said frames and said spring plank whereby said frames may tilt in unison about fixed axes on said boxes and said springs may tilt in unison about fixed axes on said frames.

13. In a railway truck, a side frame having a bolster receiving opening, a bar extending longitudinally of said side frame and journaled in the portion thereof forming the bottom of said opening, a spring carried by said bar and constructed to pivot therewith, and a bolster resting on said spring and movable transversely of said opening with the pivotal movement of said bar and spring.

14. In a railway truck, a side frame pivotally mounted on said axles to swing transversely of the truck and having a transverse opening, a bolster extending through said opening, a pivot element carried by said side frame in said opening having a fixed axis extending longitudinally of the truck, and bolster supporting structure including an elliptic spring extending through said opening having its lower yoke seated on said element and its upper yoke supporting said bolster, said structure being movable as a unit about said axis to facilitate the swinging of said side frame.

15. In a railway truck, axles, side frames pivotally mounted on said axles to swing transversely of the truck and each having a transverse opening, a bolster extending through said openings, a pivot element in each of said openings having a fixed axis extending longitudinally of the truck, a rigid spring plank extending from side to side of the truck and resting upon said elements, elliptic springs mounted on the end portions of said spring plank and supporting the end portions of said bolster.

EINAR G. HALLQUIST.